Aug. 13, 1968  A. J. TULLENERS ET AL  3,397,034
METHOD AND APPARATUS FOR TREATING EXHAUST GASES
Filed Jan. 19, 1966

INVENTORS
ANTHONY J. TULLENERS
ROBERT H. HASS
BY
Jack M. Miller
AGENT

United States Patent Office 3,397,034
Patented Aug. 13, 1968

3,397,034
METHOD AND APPARATUS FOR TREATING EXHAUST GASES
Anthony J. Tulleners, Brea, and Robert H. Hass, Fullerton, Calif., assignors to Union Oil Company of California, Los Angeles, Calif., a corporation of California
Continuation-in-part of application Ser. No. 179,949, Mar. 15, 1962. This application Jan. 19, 1966, Ser. No. 533,397
11 Claims. (Cl. 23—2)

ABSTRACT OF THE DISCLOSURE

A method and apparauts for treating the exhaust gases from an internal combustion engine to remove noxious constituents therefrom. The method comprises the steps of contacting the exhaust gases with a bed of particle-form alkaline refractory solids to agglomerate finely divided particulate matter and to neutralize the hydrogen halide constituents of the exhaust gases, subsequently separating solids from the gases and then conditioning the exhaust gases to remove noxious gaseous constituents therefrom. The invention includes an integral apparatus for treating the exhaust gases.

---

This application is a continuation-in-part of application Ser. No. 179,949, filed Mar. 15, 1962 and now abandoned.

This invention relates to the abatement of air pollution by the control of internal combustion engine emissions, and in particular concerns new and useful improvements in the method and apparatus for removing pollutant materials from the exhaust gases of automotive internal combustion engines.

The existence of noxious and harmful gaseous components, such as carbon monoxide, nitrogen oxides, sulfur oxides, oxygenated organic compounds such as aldehydes, organic acids, and peroxides, and saturated, unsaturated, and aromatic hydrocarbons in the exhaust gases expelled from internal combustion engines powering automotive vehicles is well known. Many systems have been devised in the past in attempts to remove these pollutants from exhaust gases, but little attention has been given to eliminating the particulate metal compounds in these automotive exhaust streams which result from the passage of metal-containing gasoline and oil additives through an internal combustion engine. Tetraethyl and tetramethyl lead, used extensively as antiknock additives in most hydrocarbon automotive fuels, produce lead compounds in the exhaust which contribute to air pollution, and which have substantial value if they can be recovered. Tremendous quantities of lead are expelled every day in the combustion of lead-containing fuels. For example, in the Los Angeles Basin of Southern California in excess of about 30,000 pounds of lead is exhausted from vehicles which burn about six million gallons of gasoline every day. The practical elimination of this particular source of contamination has been an unsolved problem for many years, and the presence of these lead compound particles has greatly complicated the removal of other contaminants.

Tetraethyl lead has been used extensively to provide the improved antiknock quality demanded of modern fuels to keep pace with more efficient engines having high compression ratios. Virtually all automotive gasolines today contain tetraethyl or tetramethyl lead, or both, in concentrations up to about 4 ml. per gallon (about 0.15 wt. percent lead). Commercial antiknock fluids also usually contain halogenated compounds such as ethylene dibromide and ethylene dichloride to scavenge engine combustion chambers by converting lead oxide to lead halides which have greater volatility at engine temperatures and can be expelled. These scavenger fluids are usually present in an amount per gallon of fuel equivalent to that required to combine with from about 2 to about 4 grams of lead. The elimination of lead from internal combustion engines is thus manifested primarily by the discharge of particulate oxides and halides of lead and discharge of the acid products resulting from the reaction and degradation of the scavengers. For the most part, the particulate matter in auto exhausts, on a weight basis, is composed of lead compounds which do not remain suspended in the atmosphere but fall upon the highways and accumulate.

The metal compounds in the exhaust stream have posed a serious problem in previous attempts to use afterburners or catalytic devices for purifying engine exhausts. The metal compounds, particularly those containing lead, have been found to poison most catalysts thus rapidly deactivating catalytic converters and making their use costly and impractical. Even when the catalysts are not seriously poisoned by metals such as lead, they are gradually coated with an adhesive deposit of metal salts that eventually covers the entire surface of the catalyst, plugs the pores, and thus reduces the effectiveness of the catalyst. These metal salts, usually lead salts, have also been found to interfere with the effective life of sound-attenuating mufflers and direct flame afterburners by adhering to the internals of those devices, plugging the flow areas, and increasing the pressure drop through the entire exhaust system.

The metal scavengers such as ethylene dibromide and ethylene dichloride, as well as their combustion products, also now have been found to be detrimental to exhaust conditioners, particularly catalytic afterburners. These acidic materials attack the catalyst base or support causing disintegration of the catalyst and subsequent material loss from the catalytic chamber. Thus, although the scavengers benefit engine operation by removing lead from the engine combustion chambers or by inhibiting lead deposition on the cylinder walls, contaminants are produced such as lead chloride, lead bromide, and complexes of these compounds as well as corrosive acids such as hydrochloric acid, hydrobromic acid, and the like. In the water-rich environment of the exhaust gas system, these acid products cause corrosion of metal parts as well as cause catalyst deterioration in the catalytic afterburners desinged to remove other noxious components from the exhaust gas stream.

The particulate lead compounds expelled from internal combustion engines have a wide particle size distribution which creates a further problem in that many of the particles are in a range which make recovery or removal from the exhaust gas stream very difficult. Prior art devices for removing particulate matter from exhaust gas streams have been unable to successfully handle the removal of the very small metal compound particles, many of them colloidal in size, since the particles have not agglomerated sufficiently to be put into the classification of easily separable macro particles.

It is accordingly an object of this invention to provide an improved method and apparatus for the abatement of atmospheric pollution resulting from the operation of internal combustion engines which burn fuels having metal-containing additives.

Another object is to provide an improved method and apparatus for effectively removing a major portion of the metal compound particles from automotive exhausts, thus preventing the dispersal of these pollutants into the atmosphere and onto the earth's surface.

A further object of this invention is to provide an improved method and apparatus for reducing the poisoning of catalysts used to treat internal combustion engine exhausts by removing a substantial portion of the particulate metallic catalytic poisons from exhaust gas streams thereby substantially prolonging the life of such catalysts.

A still further object of this invention is to provide an improved method and apparatus for substantially eliminating the physical deposition of metallic compound particles within the internals of mufflers and afterburners used in conjunction with internal combustion engines burning metal additive fuels.

An additional object of this invention is to provide an improved method and apparatus for obtaining optimum particle removal from exhaust gas streams of internal combustion engines.

A still further object of this invention is to provide an improved method and apparatus for enhancing the agglomeration of particulate solids in exhaust gas streams from internal combustion engines.

Another object of this invention is to provide an improved method and apparatus for reducing the disintegration and degradation of catalysts and their supports used in the treatment of exhaust gases from internal combustion engines using acid-containing and acid-forming fuels.

A further object of this invention is to provide an improved method and apparatus for the removal of acidic components from an exhaust gas stream.

Other and related objects will be apparent from the detailed description of the invention, and various advantages not specifically referred to herein will be apparent to those skilled in the art on employment of the invention in practice.

We have now found that the foregoing objects and their attendant advantages can be realized in the treatment of the exhaust from an internal combustion engine, such as is used in the propulsion of motor vehicles, by first passing the exhaust gases through an agglomeration zone containing a contact bed of particulated alkaline mineral. The alkaline mineral reacts with acidic materials in the gaseous exhaust mixture substantially eliminating these acidic materials from the exhaust gas stream. Further, small particles, droplets and the like are agglomerated by passage through the contact bed. The exhaust gases, preferably acid free and containing agglomerated particles, are then conducted to a solids separation zone wherein particulate matter is removed by any suitable solids separation means such as an inertial separator. The substantially particle-free exhaust gas stream leaving the solids separation zone can then be exhausted directly to the atmosphere, or through a conventional muffler to the atmosphere, or this exhaust gas can be subsequently passed through an exhaust purifier such as a catalytic converter or direct flame afterburner. The agglomeration and solids separation prior to the exhaust purifier results in reduced poisoning of the catalyst in catalytic converters, substantial elimination of catalyst degradation from chemical reaction with acidic materials, and minimization of the usual corrosion and coating or plugging of afterburners with metal compounds.

The agglomeration zone of this invention comprises any conveniently sized chamber containing a bed of contact bodies such as particulate mineral solids upon whose surface extremely small particles, droplets, and vapors existing in the exhaust gases can collect and agglomerate e.g., lead compounds accumulate and form large, heavy deposits which periodically crumble from the aggregate exterior surface. The agglomeration zone of this invention has among its potentially useful characteristics three primary functions which depend upon the composition of the aggregtae used, i.e., (1) massing of small particulate matter in the raw exhaust gases into macro particles, (2) neutralization of acidic materials in the raw exhaust gases, and (3) partial combustion of exhaust gas contaminants such as carbon monoxide and hydrocarbons on the hot aggregate surfaces. Any suitably sized solid refractory mineral aggregate up to several inches in diameter, typically particles from about 1/8 inch to about one inch in mean diameter, can be used which is reactive with the acidic components of the exhaust gas, and particularly with hydrogen halides, and further which is capable of operating over extended periods of time at elevated temperatures, e.g., temperatures from 600° F. to 1,500° F. and above are common. The term refractory mineral is meant to include mineral substances fusing at high temperatures and particularly those minerals fusing or disintegrating above about 1,500° F.

Suitable refractory alkaline materials for use in the agglomeration zone include various naturally occurring alkaline minerals, such as bauxite, dolomite, kaolin, aragonite, calcite, periclase, aluminite, rutile, baddeleyite, and the like. A particularly preferred refractory alkaline mineral for use in the agglomeriation zone is dolomite, an abundantly available naturally occurring mineral having desirable properties of reactivity and thermal stability. Bauxite is another preferred mineral.

The particulate solids used in the agglomeration zone have a basic or alkaline nature and react with acidic materials in the exhaust gases, e.g., HCl and HBr resulting from the combustion of scavengers such as ethylene dibromide and ethylene dichloride. Reaction of the acidic materials of the exhaust gas stream with the aggregtae solids in the agglomerator not only effects removal of these acidic constituents from the exhaust gas, but also results in a deterioration of the aggregate solids surfaces which weakens the outer surface layer so that aggregate particles sluff off in relatively large pieces. The large particles degraded from the aggregate surface carry accumulated lead particles which have impinged and adhered thereto, and thus, because of their size and weight, are easily removed in the subsequent solids separation zone. Repeated thermal and physical shocks contribute to this spalling of the outer aggregate surface, thus refreshing the aggregate surface for further neutralization and providing large particles for easy separation.

The separation zone of our invention removes particulate solids from the exhaust gas stream emanating from the agglomeration zone and can comprise any suitable solids separator effective in removing particles from gas streams. The mechanisms which can be used, either alone or in combination, for particle separation in this invention include, but are not limited to, separations classified as gravitational, inertial, filtration, electrostatic, physiochemical, sonic, and thermal. Among dust collection equipment utilizing these separation principles which can be used in our invention are filters such as cloth collectors, sonic precipitators, electrostatic precipitators, gravity settling chambers, baffle chambers, mechanical centrifugal separators, impingement separators such as baffle chambers, and the particularly preferred inertial separators such as the cyclone separator.

The cyclone separator, one of the most widely used of gas cleaning devices, generally consists of a main precipitating cylinder with a tangential gas inlet, an inverted cone attached to the base for the collection of particulate matter, and a central gas outlet. The main precipitating cylinder can have a diameter from less than one inch to several feet, depending on the efficiency desired and the amount of gas which must be handled. In a typical cyclone, the gas enters tangentially either from a horizontal duct or through directing vanes, then spirals through the annular space between the main precipitating cylinder and the central outlet tube towards the inlet of the central outlet tube into a cylindrical or conical chamber, then turns upward and forms an inner spiral of gas which leads to the central outlet tube. The solid particles impact on the walls of the separator, lose their momentum and collect at the bottom of the conical chamber of the cyclone where they are periodically removed. Cyclones are particularly effective, i.e., about 90 percent efficient, in removing particles or agglomerates 5 microns and larger. However, cyclones can remove much smaller particles, even one micron size and below. Conventional cyclone design has become standard and tables of detailed dimensions are available from many sources.

Another type of centrifugal separator used in the solids separation zone of our invention, is a mechanical centrifuge wherein the centrifugal force comes not from the motion of the gas alone, but from the rotating blades of a fan. The blades of the fan are especially shaped to direct the separated particles into an annular slot leading to a collection hopper while the clean gas continues to the scroll.

The impingement separator, another embodiment of the solids separator of this invention, is a species of the inertial separator and depends on the inertial deposition of particles as the gas passes through an obstruction. The shape of the obstruction can vary from that of simple baffles to complicated patterns which give maximum impaction efficiency with minimum pressure loss. In baffle chambers, the simplest type of impingement separators, the suspended matter is impacted in the direction of flow while the gas undergoes at least one flow reversal to separate the gas from solid particles. The tortuous flow of the baffle chamber is usually obtained by zigzagged blades or shaped obstacles placed in the gas stream. These devices are particularly suitable for removing particles larger than 20 microns.

A particular feature of our invention is the protection of exhaust conditioning devices by the pretreatment of the exhaust gas stream. This pretreatment comprises passing the exhaust gas through an agglomerating zone to increase particle size and neutralize the acidic constituents of the exhaust gas, and then through a solids separation zone to remove particulate matter. It is particularly important to the efficacy of our invention that there is a solids separation zone interposed between the agglomeration zone and the exhaust conditioning zone. Otherwise, in the absence of a solids separator, the solids from the aggregate surface in the agglomeration zone are swept into the exhaust conditioning zone with serious detrimental results. The exhaust conditioners of this invention are usually either mufflers (sound attenuators) or devices for removing contaminants, both gaseous and liquid, from the exhaust stream. Since the contaminants in automobile exhaust gases are for the most part unburned or partially burned hydrocarbons and carbon monoxide, one of the most effective methods in reducing the concentration of these contaminants lies in completing the combustion that was initiated in the engine, thereby converting the hydrocarbons and carbon monoxide into carbon dioxide and water. This is the principle of "afterburners" which are of two main types: the catalytic converter and the direct flame afterburner. The principal difference between the catalytic converter and the direct flame afterburner is that, with a catalyst present, considerably lower temperatures suffice to oxidize the combustible contaminant material.

In an oxidative catalytic converter, exhaust gases, usually with sufficient added oxygen for complete oxidation of the carbon monoxide, organic constituents, and other oxidizable contaminants, are brought into intimate contact with a catalytic material at hourly gas space velocities (volume of gas per hour per volume of catalyst) usually between about 1,000 and 100,000. A sufficiently high temperature, usually above about 250° F., must be maintained in the catalytic converter to insure continuous and complete oxidation of the contaminants to carbon dioxide and water. With both the catalytic converter and the direct flame afterburner, provisions are usually necessary for a controlled air supply. The catalyst can be used in any form, but is usually employed in a pelleted, extruded, or naturally granular form, and can be used without any support or carrier. However, more often, the catalyst is distributed on or within a support or carrier which may or may not significantly contribute to the overall catalytic activity of the catalyst-support composite. Although the invention is not limited to the use of any particular catalyst, a typical preferred oxidation catalyst comprises small pellets, e.g., $\frac{1}{32}$ inch to $\frac{1}{4}$ inch, of an activated oxide carrier or support material of high surface area such as activated alumina, silica, beryllia, thoria, titania, magnesia, zirconia, and the like, or mixtures thereof, impregnated with catalytically active metals or metal oxides or the salts of said metals, or mixtures thereof, of metals in Groups V, VI, VII, and VIII of the Periodic Table such as copper, molybdenum, tungsten, nickel, cobalt, vanadium, chromium, manganese, titanium, tantalum, iron, and the like.

Another common type of oxidation catalysts comprises the noble metals which include platinum, palladium, gold, silver, iridium, rhodium, ruthenium, osmium, etc. These noble metals, when used as catalysts, are often generally associated with a refractory metal oxide, and particularly an oxide of a metal in the left-hand column of Groups III and IV of the Periodic Table including particularly the oxides of aluminum, titanium, zirconium, hafnium, thorium, etc. Sometimes two or more metal oxides are included in the catalyst and in other cases activating components are also included in the catalyst. In general, the oxidation catalyst is usually present in an amount from about 0.01 percent to about 30 percent based on the overall combined weight of the catalyst and its support.

Suitable reduction catalysts for use in catalytic converters, either alone or in combination with oxidation catalysts, include active metals of Group VIII of the Periodic Table and/or their oxides supported on activated alumina, e.g., nickel, copper, and the noble metals. A catalytic reduction zone usually precedes a catalytic oxidation zone in a two-stage series catalytic treatment of exhaust gas streams but the catalyst in both catalytic zones can be the same with only a difference in reaction conditions existing. Any suitable oxidation or reduction catalyst can be used which is capable of operating over long periods of time at elevated temperatures, e.g., temperatures of 600° F. to 1,500° F. are common.

The successful catalysts are somewhat susceptible to metal poisoning or deactivation from lead, manganese, boron and the like. Although some catalysts appear to have a certain degree of lead tolerance, maximum catalyst life and efficiency can be attained only by the removal of metal poisons such as lead from exhaust gases prior to contact with the catalyst. Furthermore, most successful catalyst supports are attacked by the acidic materials commonly found in exhaust gas streams. In order to prevent degradation and disintegration of the catalyst support these acidic materials are also preferably removed.

When the exhaust conditioner entails combustion, an excess of an oxygen-containing gas such as air is usually added to the raw exhaust gas stream to provide sufficient oxygen for complete combustion of the oxidizable materials. Typically, the added air increases the oxygen content to a value equal to between about 105 percent and about 175 percent of the quantity stoichiometrically required for complete combustion of the oxidizable materials present in the raw exhaust gas stream. The added combustion air can be introduced at any appropriate point in the system of our invention prior to the combustion zone. For example, air can be added to the raw exhaust gas between the engine exhaust outlet and the agglomeration zone, or air can be added to the exhaust gas stream emanating from the agglomeration zone before the exhaust gases reach the solids separation zone. Also, air can be added between the solids separation zone and the exhaust conditioner combustion zone. If the exhaust conditioner comprises two zones such as a catalytic reduction zone and a subsequent catalytic oxidation zone, the air can be added to the exhaust gas stream after the reduction zone and prior to the combustion zone. Although in specific applications air, or other oxygen-containing gas can be added at any of the aforementioned locations, it is usually preferred to add the combustion air to the raw exhaust gas between the engine exhaust outlet and the agglomeration zone to effect cooling of the exhaust gases prior to entry into the agglomeration zone. Where air is added at this preferred location, the agglomeration zone as well as the entire exhaust gas treating system are maintained under oxidizing conditions.

Our invention will be more readily understood by reference to the accompanying drawings which form a part of this application.

Figure 1:
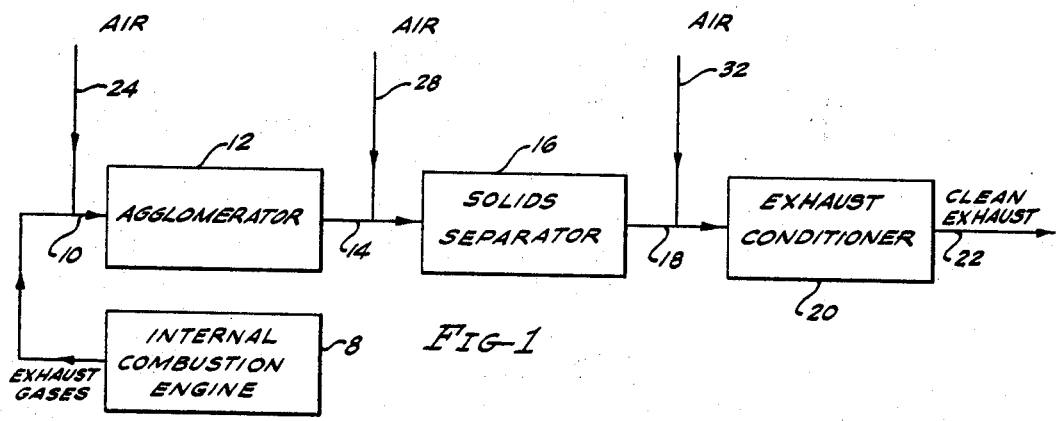
FIGURE 1 is a schematic flow diagram of a system suitable for carrying out the process of this invention.

It is to be understood that although the air pollution abatement method and apparatus of this invention is particularly applicable to internal combustion engines used in automotive vehicles, it is also broadly useful for other combustion engines such as those used in stationary installations, airplanes, and the like which use acid-forming and/or metal-containing fuels and oils.

A specific example of the process of this invention is hereinafter more particularly described with reference to FIGURE 1. Exhaust gases from an automobile internal combustion engine 8 burning a "leaded" gasoline, i.e., a 99 Research octane fuel which contains 2.93 milliliters of tetraethyl lead (motor mix) per gallon, including ethylene dibromide and ethylene dichloride, enter our exhaust gas treatment system from the engine exhaust manifold through line 10. These exhaust gases enter line 10 at a normal load temperature of between about 1,000° F. and 1,600° F. and at a flow rate of between about 6 s.c.f./minute at idle and about 250 s.c.f./minute at full throttle acceleration (s.c.f.=cubic feet at 60° F. and one atmosphere pressure). The particle laden exhaust gases entering line 10 contain primarily carbon dioxide, carbon monoxide, water, lead compounds, acidic materials, oxides of nitrogen, unburned and partially burned hydrocarbons.

In this specific embodiment of our invention, air is introduced into the exhaust gas stream in line 10 via line 24 prior to entry of the exhaust gas stream into agglomeration zone 12 and air lines 28 and 32 are blocked closed. The air is supplied to line 24 from a conventional variable delivery fan (not shown) whose output varies directly with internal combustion engine speed. Thus, when there is maximum exhaust gas flow (maximum engine speed) there is maximum air supplied to the exhaust conditioner, and when there is minimum exhaust gas flow (low engine speed) there is minimum air supplied to the exhaust gas stream entering agglomeration zone 12. However, any conventional air supply, variable or not, is satisfactory for use in our invention as long as sufficient air is provided when oxidative exhaust conditioners are used. Also, the air may or may not be preheated as is suitable for specific catalysts and system designs. The air supplied in this specific example provides about 120 percent of that amount of oxygen stoichiometrically required to oxidize all of the combustible components in the exhaust gas stream flowing through line 10. Air can also be introduced into line 14 via line 28 or introduced into line 18 via line 32 to provide the necessary combustion air in exhaust conditioner 20. When air is introduced via line 24 there is often partial combustion of hydrocarbons in agglomerator 12 on the hot surface of the granular material contained therein. When air is introduced into line 14 via line 28 there can be a beneficial cooling of the exhaust gas stream, if the air is not preheated, which improves the separation in solid separator 16, particularly when solid separator 16 is a cyclone. Line 10 conveys these raw exhaust gases and added air into agglomerator 12 which contains about 20 pounds of granular bauxite. The average hourly gas space velocity (volume of gas per hour per volume of aggregate) in agglomerator 12 is about 10,000 at an average temperature of about 900° F. Particulate matter in the exhaust gas stream impinges and collects on the surface of the bauxite aggregate in agglomerator 12, thus massing the very small particles into larger, easily separable particles. Furthermore, acidic materials in the exhaust gas stream, such as the hydrogen bromide and hydrogen chloride, react with the granular bauxite to form products such as aluminum chloride and aluminum bromide in agglomerator 12. Sporadically, accumulated solids and the reaction product spall from the surface of the bauxite granules into the exhaust gas stream and are swept from agglomerator 12 via line 14 into solids separator 16.

Solids separator 16 is a conventional cyclone separator which has a pressure drop of about 4 inches of water at a 50 m.p.h. cruising speed (about 50 s.c.f./minute of exhaust), and which is capable of separating substantially all of the particulate solids from the exhaust gas stream emanating from agglomerator 12. The solids separated in solid separator 16 are collected therein and the solids accumulation (about 0.4 pound/1,000 miles) is periodically removed. The cleaned gas stream, substantially free of solids, particles and acidic components, is removed from solid separator 16 via line 18 at a temperature of about 850° F. and conducted to exhaust conditioner 20.

Exhaust conditioner 20 comprises an oxidative catalytic converter containing about 25 pounds of ¾ inch catalyst pellets. The catalyst pellets in exhaust conditioner 20 comprise an activated alumina carrier having about 0.5 percent by weight of rhodium dispersed thereon. The average hourly gas space velocity (volume of gas per hour per volume of catalyst) over extended periods of operation is about 7,000 at an average conversion temperature of about 800° F. The hydrocarbons, carbon monoxide, and other oxidizable components of the acid-free exhaust gas stream are catalytically oxidized in exhaust conditioner 20 to produce a purified exhaust gas comprising essentially carbon dioxide, water, nitrogen, and oxygen.

There is substantially no deterioration of the activated alumina catalyst support carrying the rhodium catalyst over extended periods of normal automotive operation when this specific embodiment of the exhaust gas treatment system of our invention is employed as previously described with relation to FIGURE 1. After long periods of operation there is only a slight loss of catalyst which is attributed to normal attrition. In contrast, when agglomerator 12 containing the neutralizing bauxite aggregate is bypassed, i.e., when line 10 is connected directly to line 14, the catalyst support is attacked and rapidly disintegrates so that in a short time the catalyst pellets fall apart and are expelled into the atmosphere causing heavy losses of the expensive rhodium catalyst. Also, when the process of our invention is followed as previously described, there is substantially no lead deposition on the catalyst in exhaust conditioner 20. But, when agglomerator 12 is bypassed, the lead particles apparently do not mass together sufficiently to provide optimum particle separation and substantially more lead particles are discharged from solids separator 16 and a much greater deposition of lead appears on the catalyst in exhaust conditioner 20 than when agglomerator 12 is in the system. Thus, our invention provides an unexpectedly high degree of protection which results in a materially extended catalyst life over that in catalytic air pollution abatement devices previously available, thus making feasible the use of expensive, high activity catalysts.

Lines 10, 14, 18, and 22 are usually constructed of 1½ to 2-inch I.D. steel tubing, such as is conventional for exhaust system piping. However, any tubing or conduit size or material can be used which provides the appropriate flow velocities, pressure drops, and structural strength.

The overall pressure drop of the exhaust gas treatment system shown in FIGURE 1 is usually from about 2 to about 10 inches of water at crusing speed (about 50 m.p.h.), but this pressure drop can vary from less than 1 inch of water to more than 15 inches of water with conventional passenger automobiles. Also, the representation in FIGURE 1 is illustrative of an exhaust gas system having a single exhaust gas line, but it is common in modern internal combustion engines, particularly those with eight cylinders, to have dual exhaust systems conducting the exhaust gases from each side of the engine to separate exhaust gas systems. In such a case, the system as shown in FIGURE 1 is duplicated for each side with appropriate sizing to accommodate the reduced exhaust gas flow. The method and apparatus of our invention can be applied to engines on vehicles having dual exhaust systems and any number of agglomerators, or solid separators, or catalytic converters can be integrated into the exhaust gas system.

Figure 3:
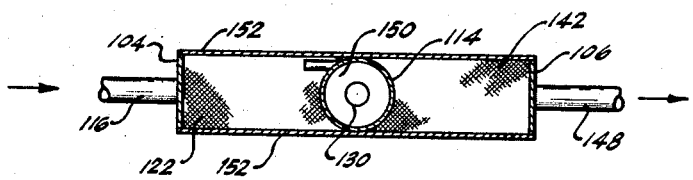
FIGURE 3 is a horizontal sectional view in reduced size of the air pollution abatement device of FIGURE 2 taken on the line 3—3.
Figure 2:
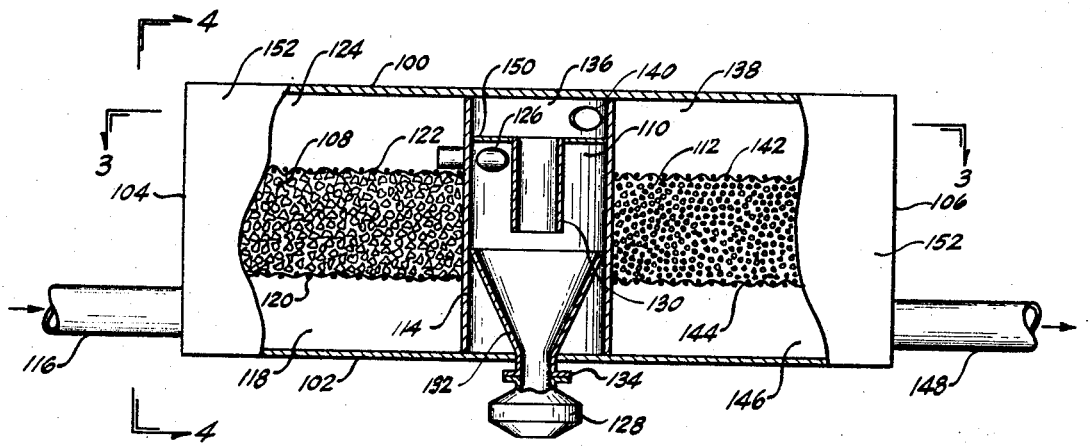
FIGURE 2 is a view in partial cross-section of an air pollution abatement device which can be used in this invention.
Figure 4:
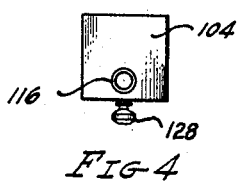
FIGURE 4 is an end view in reduced size of the apparatus of FIGURE 2 taken on the line 4—4.

A particular embodiment of the exhaust gas treatment apparatus of our invention is illustrated in FIGURES 2, 3 and 4. The air pollution abatement apparatus therein illustrated comprises a rectangular chamber having top wall 100, bottom wall 102, end walls 104 and 106, and side walls 152. Contained within the chamber comprising walls 100, 102, 104, 106, and 152 is an aggregate bed 108, a cyclone separator 110, and a catalyst bed 112. For simplicity of illustration, the assembly and disassembly details such as screws, bolts, clips and the like are not shown for the device illustrated in FIGURES 2, 3, and 4. However, the air pollution abatement apparatus therein shown is designed to provide ready access to the interior by means of removable walls or sections thereof for refilling and for changing the aggregate and catalyst beds as required. Aggregate bed 108 and catalyst bed 112 are isolated from each other by cyclone separator 110, which comprises a centrally located cyclone separator 110 whose cylindrical outer housing 114 serves to physically separate aggregate bed 108 from catalyst bed 112. The raw exhaust gases, emanating from an internal combustion engine (not shown) using a leaded gasoline, are mixed with added air in an amount sufficient to provide in excess of the amount of oxygen stoichiometrically required for complete combustion, and the mixture is conducted via exhaust gas conduit 116 into gas space 118. This raw exhaust gas and air mixture passes substantially uniformly upward through aggregate retaining screen 120 into aggregate bed 108 which comprises a mass of particle-form solids, such as the aforementioned alkaline refractory minerals. Within aggregate bed 108, small solids particles such as lead compound particles in the raw exhaust gas stream are agglomerated, acidic materials in the exhaust gases are reacted with the aggregate to form salts such as aluminum halides, and some hydrocarbons are burned. The gases then pass from aggregate bed 108 upward through aggregate retaining screen 122 into gas space 124.

The particle laden exhaust gases, substantially free of acidic materials, pass from gas space 124 into cyclone separator 110 through tangential opening 126 in outer wall 114 of cyclone separator 110. Opening 126 is located below baffle 150 which separates cylone separator 110 into a lower separation section and upper gas space 136. These exhaust gases, tangentially introduced into cylindrical cyclone separator 110 via opening 126, are accelerated to outer housing wall 114 and form an outer vortex which spirals towards solids collector 128. At the same time, an inner vortex is formed between the entrance of central gas outlet tube 130 and solids collector 128 which, although spiraling in the same radial direction as the outer vortex, passes out the central gas outlet tube 130. Because of the law of conservation of momentum, the angular velocity of the inner vortex is greater than that of the outer vortex. This difference in angular velocity creates the centrifugal driving force necessary to force the particulate solids, such as lead particles, towards the wall 114 of cyclone separator 110. Although illustrated in a vertical attitude, because of the high centrifugal acceleration imparted to the particles, the cyclone operates just as effectively in the horizontal position or in some intermediate angular position as when the longitudinal axis of the cyclone is in a vertical position as shown here.

The solid particles, concentrated by centrifugal action at the periphery of cyclone vessel 110, impact on outer wall 114 and are carried along the outer wall 114 towards solids collector 128. Thus, the swirling outer gas vortex within cyclone separator 110 carries the solids into conical collector 132 wherein they lose their momentum and fall into solids collector 128. The metal compound particles are periodically recovered from solids collector 128 by detaching solids collector 128 from conical collector 132 at flange 134. Of course, solids collector 128 can be attached to the bottom of cyclone separator 110 by either a flange fitting as shown, or by a threaded fitting, a clamp, or any other suitable detachable connecting means.

The exhaust gas spirals downwardly between outer wall 114 of cyclone separator 110 and central gas outlet tube 130 to the opening in central gas outlet tube 130 which is located below the tangential opening 126. The cleaned exhaust gas, substantially free of solid particles, then flows into central gas outlet tube 130 which connects directly to gas space 136. Gas space 136 communicates with adjacent gas space 138 located above catalyst bed 112 by means of cleaned gas outlet 140. The cleaned exhaust gas passes from gas space 136 to gas space 138 and downwardly from gas space 138 through catalyst retaining screen 142 into catalyst bed 112. In catalyst bed 112, comprising ⅜ inch pellets of silica-stabilized alumina impregnated with about 10 weight percent chromia, the oxidizable materials are catalytically combusted to form oxidation products, primarily water and carbon dioxide. The purified exhaust gas then passes from catalyst bed 112 through catalyst support screen 144 into gas space 146. Cleaned and purified exhaust gas then exits to the atmosphere from gas space 146 via tail pipe 148 which is in open fluid communication with gas space 146. Retaining screens 122 and 142 and support screens 120 and 144 can be constructed of any suitable foraminous structural material such as perforated metal plates, wire screens, metal gauze, perforated ceramic sheets, and the like. A preferred material is a heavy steel wire screen which has been aluminum coated.

Although the invention described herein has as a principal purpose the removal of acidic materials and lead particles from the exhaust gas stream, it has been found that the agglomerator and the solids separator are also valuable in protecting catalytic exhaust conditioning devices from detrimental slugs of liquid hydrocarbon, water condensate, etc. which occasionally are expelled through the exhaust gas manifold because of engine malfunction, cold start-up conditions, and the like. If such liquid materials are carried through the pretreatment or agglomeration zone they will be retained in the solids collector of the solids separator. Thus, any such liquids separated from the exhaust stream are gradually vaporized in the collection zone of the solids separator and returned to the exhaust stream as a gaseous component.

While the foregoing specific examples have been described with particular reference to the removal of solid lead compounds and acidic components from exhaust gases, it is to be understood that any metal-containing particle as well as any material which degrades the catalyst supports can be removed by the method and apparatus of this invention. For example, if a gasoline additive contains other metals, such as boron, manganese, phosphorous and the like, then the oxides, halides, and similar compounds of these metals are removed from the exhaust stream by the solids separator. Although the major portion of the metallic solids and acidic materials in the exhaust gas is derived from metal-containing fuel additives such as lead and manganese, and their accompanying halide scavengers, a portion of the metal and acid also comes from the additives used in compounding lubricating oils. Lubricating oil is constantly being burned in the combustion chamber of an internal combustion engine, and the combustion products, including some acidic and metal compounds, are exhausted with the fuel combustion products. Some of the metals commonly found in lubricating oils, such as phosphorous, zinc, boron, potassium, and the like are known catalyst poisons and their removal from the exhaust stream is advantageous for the same reasons previously discussed with respect to lead. Another source of metal compound particles in the exhaust gas stream is the products of the corrosion which takes place in the engine interior and exhaust gas manifold. This corrosion produces iron oxides and salts as well as oxides and salts of alloying elements, all of which are advantageously removed from exhaust gases prior to catalytic treatment.

In the particular embodiment wherein a cyclonic separator is utilized as the solid separator in the air pollution abatement device of our invention, the cyclone behaves like an orifice and exhibits a pressure drop which increases with the square of the gas velocity. This pressure drop is the so-called back pressure on the engine combustion chamber. Cyclones operate more efficiently at higher pressure drops, but any added back pressure on the engine exhaust outlet results in a power loss. Consequently the ultimate design in our invention is a compromise between engine performance, cyclone efficiency, and the pressure drop of the agglomeration zone and the catalytic zone. As a design basis, the pressure drop of the device of our invention is usually set at a value no greater than that of a standard muffler. The normal pressure drop in the conventional exhaust systems of automotive vehicles is in the range of 2 to 10 inches of water. Cyclones are least efficient at low speeds and idle, and most efficient at high speeds and during acceleration. However, these characteristics are not necessarily disadvantageous since it is during periods of higher power output that most of the detrimental particulate matter, such as lead compounds, is exhausted from internal combustion engines.

The apparatus of this invention, and in particular the solid separators such as the inertial separators, can be installed in any combination of numbers and sizes desired to obtain a particular pressure drop. Thus, solid separators such as cyclones and the like can be installed in series or in parallel to provide any desired particle separation efficiency and pressure drop. If it is desired to take a greater pressure drop in the exhaust gas treatment system of this invention than the conventional 2 to 10 inches of water, then some form of flow booster such as a fan, pump, aspirator or the like can be incorporated into the exhaust system to provide the necessary energy to overcome the additional pressure drop through the exhaust system.

Various other changes and modifications of this invention are apparent from the description of this invention and further modifications will be obvious to those skilled in the art. Such modifications and changes are intended to be included within the scope of this invention as defined by the following claims.

We claim:

1. A process for treating the exhaust gases from an internal combustion engine operated on a fuel containing halogen compounds that form hydrogen halides in the engine, which comprises:

agglomerating finely divided particulate matter in the raw exhaust gases discharged from said engine into particles of a larger size and neutralizing the hydrogen halides contained in said gases by passing said exhaust gases through a bed of particulate alkaline refractory mineral solids which are reactive with the hydrogen halide components of said raw exhaust gases and which have the characteristic of sporadically losing macro particles from their outer surface;

passing the particle-laden exhaust gases from said agglomeration zone through a solids separation zone whereby there is produced a cleaned exhaust gas having a substantially reduced solids particle content; and passing said cleaned exhaust gas from said solids separation zone through an exhaust gas conditioning zone whereby there is produced a conditioned cleaned exhaust gas.

2. The process defined in claim 1 wherein said refractory minerals do not undergo substantial fusion at temperatures below about 1500° F.

3. The process defined in claim 1 including the step of adding an excess of air to said exhaust gases prior to passing said gases to said exhaust gas conditioning zone to provide therein an amount of oxygen in excess of that required for complete oxidation of the combustible constituents of said exhaust gases.

4. A process for removing noxious components from the exhaust gases from an internal combustion engine burning a fuel containing metal and halogen compounds that form hydrogen halides in the engine, which comprises:

adding air to the raw exhaust gases discharged from said internal combustion engine to provide an amount of oxygen therein in excess of that required for complete oxidation of the combustible constituents of said exhaust gases;

passing said exhaust gases and admixed air through an agglomeration zone containing a bed of granular alkaline refractory mineral solids which are reactive with the hydrogen halide components of said raw exhaust gases and which serve to agglomerate finely divided particulate matter into particles of larger size, said mineral solids exhibiting the property of sporadically losing macro particles from their outer surface;

passing the particle-laden exhaust gases from said agglomeration zone through a solids separation zone whereby there is produced a cleaned exhaust gas having a substantially reduced solids content; and passing said cleaned exhaust gases through a catalytic oxidation zone containing catalytic oxidation catalyst whereby there is produced purified exhaust gases from said catalytic oxidation zone, said purified exhaust gases having a substantially reduced concentration of noxious components.

5. A process as defined in claim 4 wherein separated solid particles are periodically removed from said solids separation zone.

6. A process as defined in claim 4 wherein said oxidation catalyst comprises a noble metal supported on an activated oxide carrier.

7. An apparatus for treating the exhaust gases of an internal combustion engine, which comprises:

an outer shell defining an enclosed, elongated interior chamber;

solids separation means for removing and collecting particulate solids from the exhaust gases of said internal combustion engine, said means being positioned within a central section of said interior chamber so as to partition said chamber into an agglomeration zone and a conversion zone longitudinally disposed at opposite ends of said interior chamber with said solids separation means positioned therebetween;

a raw exhaust gas inlet to said agglomeration zone;

a raw exhaust gas conduit communicating from said internal combustion engine to said raw exhaust gas inlet to said agglomeration zone;

air introduction means communicating with said raw exhaust gas conduit for adding air to said raw exhaust gases entering said agglomeration zone;

a particle-laden exhaust gas outlet from said agglomeration zone communicating with said solids separation means and spaced apart from said raw exhaust gas inlet;

aggregate support means adapted to support a bed of granular aggregate within said agglomeration zone between said raw exhaust gas inlet and said particle-laden exhaust gas outlet so that gases entering said agglomeration zone contact said aggregate;

cleaned exhaust gas discharge means communicating with said conversion zone for transporting cleaned exhaust gases from said solids separation means to said conversion zone;

treated exhaust gas outlet means for discharging treated exhaust gases from said conversion zone; and catalyst support means adapted to support a bed of particle-form oxidation catalyst within said conversion zone between said cleaned exhaust gas discharge means and said treated exhaust gas outlet means.

8. The apparatus defined in claim 7 wherein said solids separation means is a cyclone separator.

9. The apparatus defined in claim 7 including means for removing said collected solid particles from said solids separation means.

10. The process defined in claim 1 wherein said alkaline refractory mineral is selected from the group consisting of dolomite and bauxite.

11. The process defined in claim 4 wherein said alkaline refractory mineral is selected from the group consisting of dolomite and bauxite.

References Cited

UNITED STATES PATENTS

| | | | |
|---|---|---|---|
| 931,515 | 8/1909 | Sprague | 23—2 |
| 1,716,479 | 6/1929 | Bilsky | 23—2 |
| 3,056,662 | 10/1962 | Ridgway | 23—2 X |
| 3,253,400 | 5/1966 | Hass | 60—30 |

FOREIGN PATENTS 435,560   9/1935   Great Britain.

OSCAR R. VERTIZ, *Primary Examiner.*

A. GREIF, *Assistant Examiner.*